Sheet 1 - 2 Sheets.

B. T. Harris.

Time Check.

Reissued Jul. 6, 1858.

Witnesses:
Samuel W. Scull
Thomas G. Harold

Inventor:
Benj. T. Harris

Sheet 2 - 2 Sheets.

B. T. Harris.

Time Check.

Reissued Jul. 6, 1858.

No. 571.

Witnesses:

Samuel W. Sewell

Thomas G. Harold

Inventor:

Benj. T. Harris

UNITED STATES PATENT OFFICE.

B. T. HARRIS, OF BROOKLYN, NEW YORK, ASSIGNOR TO M. E. HARRIS, OF SAME PLACE.

IMPROVEMENT IN MACHINES FOR MARKING TIME OF ATTENDANCE OF WORKMEN.

Specification forming part of Letters Patent No. 17,997, dated August 11, 1857; Reissue No. 571, dated July 6, 1858.

*To all whom it may concern:*

Be it known that I, BENJAMIN T. HARRIS, of Brooklyn, in the county of Kings and State of New York, have invented certain new and useful Improvements in Registers for Indicating the Presence or Absence and Time of the Arrival and Departure of Workmen or Employés, which I have described in the following specification and illustrated in the accompanying drawings with sufficient clearness to enable others of competent skill to make and use my invention.

The nature of my said invention consists in a registering-surface revolved by clock-work, in combination with a device for marking upon said surface the arrival and departure of workmen or employés, where, by the position of said marks on the aforesaid surface denoting the time of arrival and departure, the number of hours occupied is also definitely indicated.

My invention also relates to denoting, by inspection, the presence or absence of workmen or employés by an indicator that shows alternately black or white (or dissimilar colors) at an opening opposite the number given to each workman or employé, or opposite to his name, said indicator being moved by the party every time he enters or leaves the premises.

Figure 1:
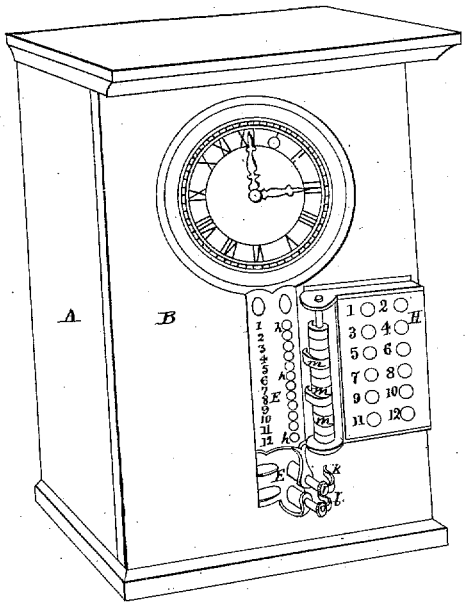
Figure 2:
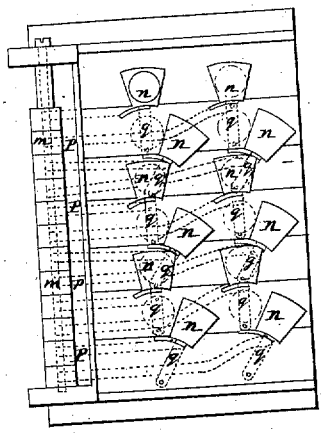
Figure 3:
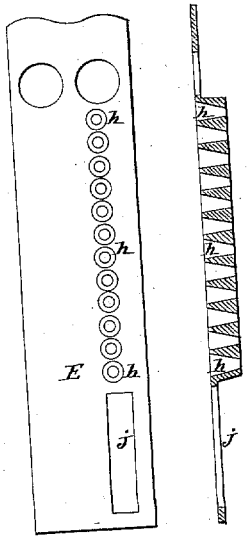
Figure 4:
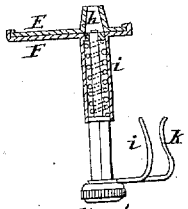
Figure 4:
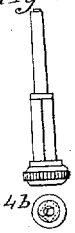
Figure 4:
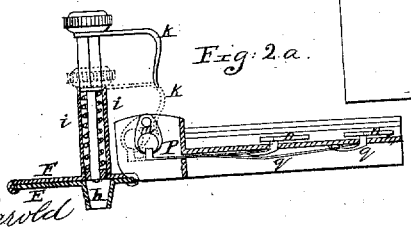
Figure 4B:
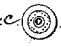
Figure 4C:
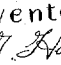
Figure 5:
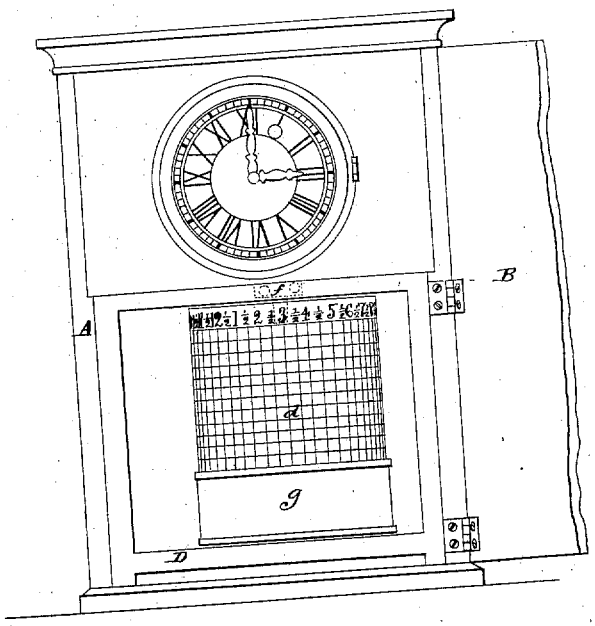
Figure 6:
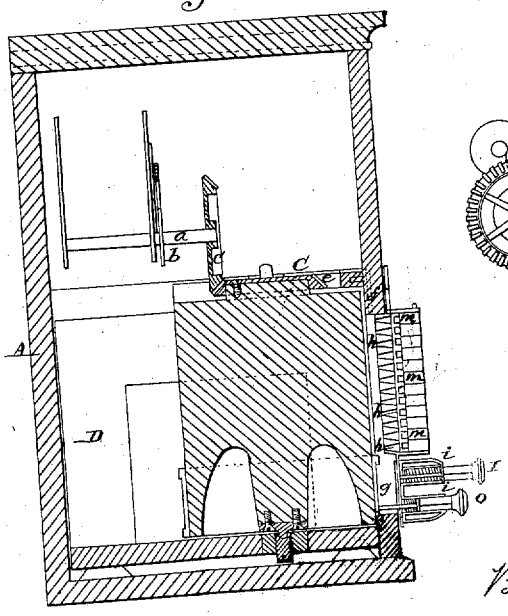
Figure 6:
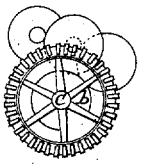

In the accompanying drawings, Figure 1 is a perspective view of my improved machine. Fig. 2 is a detail elevation of the slides which indicate the presence or absence of the workman. Fig. $2^a$ is a plan of the same. Fig. 3 is a detail elevation of the plate which forms the gage for the markers. Fig. $3^a$ is an edge elevation of the same plate. Fig. 4 is a plan, in section, of the same thing, with the markers and the slide which carries them attached. Fig. $4^a$ is a plan of one of the markers. Fig. $4^b$ is an end elevation of the marker which indicates the arrival of the workman. Fig. $4^c$ is an end elevation of the marker which indicates the departure of the workman. Fig. 5 is a front elevation of the machine, with the door open and part of it removed. Fig. 6 is a vertical transverse section showing those parts of the machine that lie at the right-hand side of a plane passing through the center of a machine from front to back. Fig. $6^a$ is an elevation showing how the cylinder that carries the paper may be connected to the gearing of a common clock.

A is the outside case of the machine. B is the door.

In the upper part of the case A a common clock is placed, having nothing to distinguish from those in every-day use except the addition of the shaft *a*, with the pinions *b*, and the bevel-wheel *c* upon it. The shaft *a* receives motion from the hour-wheel of the clock, working into the pinion *b*.

C is a cylinder receiving the paper *d*, upon which the time is to be registered. Each sheet is sufficiently large for registering a day's work, is check-ruled, and has the hours marked, as shown in Fig. 5, the ruling and marking corresponding with the motion of the cylinder and the hours of the day, said cylinder receiving motion from the bevel-wheel *c* gearing into the bevel-wheel *e* upon the cylinder. The cylinder C is hung in the case or frame D, which may be inserted in the case A or removed at pleasure. It is removed by drawing it forward. A piece of metal, *f*, with three pins in it, (the lower one pointed,) is used to keep the cylinder from turning after it is disengaged from the clock-work by being attached at the time of removal, the two upper pins entering the frame and the lower one piercing the paper.

*g* is the inking-pad, which surrounds the lower part of the cylinder C, for inking the type or markers. A plate, E, is bolted to the door B, and upon the plate the frame F, in which the markers are hung, freely slides up and down. The plate E is pierced with holes *h*, opposite each of which a number is placed corresponding with its place in the row. These holes *h* are conical, and serve to guide the markers as they are thrust through the plate E to mark upon the paper *d* at the time of entrance and departure of the workman.

The operation of this part of the machine is as follows: The paper having been properly put on and the cylinder and all parts of the machine arranged in order, a workman, upon entering the shop in the morning, approaches the machine, and, after pressing the upper marker I through the slot *j* against the ink-pad, raises it till it is opposite his number, and then presses it against the paper on the cylinder. This prints the letter I upon the paper opposite his number or name, which should be printed on the left-hand margin of the sheet, at the same height of his number on the door. As these markers cannot be moved to the right or left, it is easy to see that this impression upon the paper must indicate with certainty the precise time at which it was made. When the workman leaves the shop, he goes to the register, as before, and in the same manner makes an impression opposite his number with the marker O, which registers the time of leaving.

By this device each workman is made to keep his own time, and that, too, without being able to keep a fraudulent account, the number of holes in the plate E being, of course, as great as the number of workmen employed, and the length of the cylinder and of the paper upon it being made to correspond with the distance occupied by the holes *h*. After being operated, the markers are thrown out by spiral springs *i*. There are two arms, *k l*, (one attached to each of the markers,) which, as the marker is pushed in to make an impression upon the paper, presses against one of the cams *m*, by which the slides or indicators *n* are operated, the cams *m* being connected to the indicators *n* by the connecting-rods *p*. (Shown in red lines in Fig. 2.) These indicators *n* are hung upon short arms *q*, as indicated by dotted lines in Fig. 2. The indicators *n* are alternately white and black, and the bed which they cover is striped with white and black alternately, as represented in Fig. 2. They are seen through the holes in the plate H, as represented in Fig. 1, the black indicators covering the holes and the white not covering them before they are operated by the workman on entering the shop. As the workman pushes in the marker I to mark the time of his arrival upon the paper, the arm *k* turns the cam which operates the indicator opposite his number and shows a white surface through the hole opposite his number in the plate H. When the marker O is pushed in by the workman to indicate the time of leaving, the arm *l* operates the cam in the opposite direction and shows the black surface, as before.

Having thus described the nature and operation of my said invention, I remark that the advantages of the same will be apparent on inspection, for it becomes impossible to make a wrong record as to time, for, the cylinder moving with the clock-work, the time of arrival and departure are definitely indicated by the mark made by the workman or employé; and the device composed of the perforated plate, one perforation in which is allotted to each workman, and the slides or their equivalents behind said perforations, indicate by the black or white or dissimilar colors either the presence or the absence of the employé; and this indication by inspection is very important, as informing the principals or others of the number of persons present in the establishment.

What I claim as my invention, and desire to secure by Letters Patent, is—

1. The combination of a registering-surface operated by clock-work, with markers so applied as to mark on said surface and indicate the presence or absence of the employé or workman at or from the period of time denoted by the position of the registering-surface, as specified.

2. A perforated plate, in combination with a slide or its equivalent, whereby the presence or absence of the employé or workman to whom each perforation is allotted is indicated, upon inspection, by means of black and white or dissimilar colors exhibited behind said opening, as specified.

In witness whereof I have hereunto set my signature this 8th day of June, 1858.

BENJ. T. HARRIS.

Witnesses:
LEMUEL W. SERRELL,
THOMAS G. HAROLD.